(12) United States Patent
Marten et al.

(10) Patent No.: US 7,075,523 B2
(45) Date of Patent: Jul. 11, 2006

(54) DATA ACQUISITION FROM CAPACITIVE TOUCH PAD

(75) Inventors: Victor Marten, Flushing, NY (US); Wei Wang, Oak Park, CA (US)

(73) Assignee: Semtech New York Corporation, Camarillo, CA (US)

( * ) Notice: Subject to any disclaimer, the term of this patent is extended or adjusted under 35 U.S.C. 154(b) by 0 days.

(21) Appl. No.: 10/533,106

(22) PCT Filed: Oct. 28, 2003

(86) PCT No.: PCT/US03/33772

§ 371 (c)(1),
(2), (4) Date: Apr. 28, 2005

(87) PCT Pub. No.: WO2004/040538

PCT Pub. Date: May 13, 2004

(65) Prior Publication Data

US 2006/0017701 A1   Jan. 26, 2006

Related U.S. Application Data

(60) Provisional application No. 60/319,651, filed on Oct. 28, 2002, provisional application No. 60/320,274, filed on Jun. 13, 2003.

(51) Int. Cl.
*G09G 5/00* (2006.01)
(52) U.S. Cl. ..................................... 345/173; 345/174
(58) Field of Classification Search ................ 345/156, 345/168, 169, 173, 174, 178, 179, 172, 176; 178/18.01, 18.02, 18.03, 18.04, 19.03, 19.06, 178/19.07, 20.03, 18.06; 349/112
See application file for complete search history.

(56) References Cited

U.S. PATENT DOCUMENTS

| | | | | |
|---|---|---|---|---|
| 5,777,604 A | * | 7/1998 | Okajima et al. | 345/173 |
| 6,373,474 B1 | * | 4/2002 | Katabami | 345/173 |
| 6,734,843 B1 | * | 5/2004 | Bertram et al. | 345/173 |
| 6,738,048 B1 | * | 5/2004 | Rundel | 345/173 |
| 6,753,853 B1 | * | 6/2004 | Dotson | 345/173 |

* cited by examiner

*Primary Examiner*—Vijay Shankar
*Assistant Examiner*—Nitin Patel
(74) *Attorney, Agent, or Firm*—Oppedahl & Olson LLP

(57) ABSTRACT

A Circuit (in FIG. 1) and an Algorithm for Data Acquisition from Capacitive Touch Pad Sensor employs charge transfer to sense capacitance. The circuit has high degree of noise rejection from both system and externally generated noises; it is resistant to the effects of ESD; utilizes a general purpose "off the shelf" components and programmable microcontroller (element 10), providing flexibility for changes and adjustments without incurring the high costs of a custom IC design. A settling time and low sensitivity to the noise.

13 Claims, 13 Drawing Sheets

DATA ACQUISITION FROM CAPACITIVE TOUCH PAD

This application claims priority from U.S. application Nos. 60/319,651 filed Oct. 28, 2002 and 60/320,274 filed Jun. 13, 2003, each of which is hereby incorporated herein by reference for all purposes.

BACKGROUND

Modem computing devices typically utilize some form of pointing device for interactions of the user(s) with the Operating System (OS) or Graphical User Interface (GUI). The Capacitive Touch Pad (CTP) is well established as the pointing device of choice for Laptop and Notebook portable computers, and other devices. Most laptop computers are produced with a Capacitive Touch-Pad being either a main pointing device or one of the two built-in pointing devices.

The Touch Pad pointing devices are quite popular in portable computers due to simplicity of operation and fair pointing performance. Touch Pad pointing devices based on the capacitance sensing also feature "pressure-less" operations, where the finger actually does not exert any force on the pad, and may in fact hover over the surface of the pad without touching it. This contrasts with other Pad-form pointing devices, such as Resistive Touch Pad units that rely on the deformation of the surface in order to produce an electrical contact at the point of touch and, ultimately, the coordinates for the point of contact. The resistive Touch Pad may require the use of a special stylus, a familiar tool for PDA devices.

When working in a system, the CTP is exposed to a variety of noise sources from inside of the device, such as main CPU clocks, memory signals, etc., as well as external sources, such as cellular phones operated in close proximity and voltages induced on the fingers of the user, which include interference from a power line (mains) at 50 Hz or 60 Hz. It is desirable to reduce the sensitivity of the CTP to all of these noise sources.

A typical office or home environment provides plentiful opportunities for generation of static electricity, with potentially harmful Electro-Static Discharges (ESD) to the electronics of the CTP, when the user is first touching the surface of the Capacitive Sensor. It is desirable to prevent misoperation and/or destruction of the CTP from ESD.

As the name implies, the Capacitive Touch-Pad relies on the measurements of the changes of capacitance in order to ascertain the position of the pointing digit.

A Capacitive Touch-Pad typically consists of the Sensor with an array of electrodes arranged into two groups perpendicular to each other, and the data acquisition and control circuit. More often than not, the Sensor and all of the requisite electronic components are combined into a single assembly, with the PCB (Printed Circuit Board), typically of a multi-layer construction, serving both as the circuits interconnect and the Sensor itself.

The electrodes are typically arranged in such a way that one group runs parallel to the X axis of the unit, and the second group runs parallel to the Y axis of the unit, with the electrodes in each group proportionately spaced across the face of the unit in, respectively, X and Y dimensions, for example, as illustrated in FIG. 6.

Previous investigators have pursued many ways to try to employ such an arrangement of electrodes and the circuitry required to extract the position information. While the electrodes may be implemented using complicated shapes and various methods to facilitate galvanic isolation between the groups of electrodes and between individual electrodes in each group, nearly all prior-art approaches have generally followed the structure depicted in FIG. 6.

When the finger approaches the surface of the Sensor, a local disturbance of the capacitance is created. The amount of disturbance is measured on the nearby electrodes, and the exact position between the electrodes is extrapolated.

Typically, one group of electrodes would supply excitation in the form of the trains of pulses, with one or more electrodes providing the excitation waveform, and the rest of the electrodes in the same group floating or tied to the constant potential. Excitation can also be generated in the form of controlled currents.

On the other hand, the same or the second group of electrodes would be used to measure the AC waveforms resulting from cross coupling between various electrodes, both due to Sensor construction and the proximity of the pointing digit.

It is possible to create a circuit where each and every electrode is capable of both supplying the excitation and measuring the AC waveform.

The extraction of the useful signal is typically carried with a synchronous detector, capable of suppression of noise and unwanted signals due to their phase difference or non-synchronicity to the excitation signal.

A Block Diagram for the Prior-Art circuits is shown in FIG. 9.

Depending on the construction of the Sensor, the shape and relative location of individual electrodes, the resulting cross-coupling waveform may be smaller, larger, or the same for various positions of the finger relative to the Sensor.

U.S. Pat. No. 6,222,528 by Gerpheide et al., describes a system where a common electrode is used to pick-up a cross-coupling signal from X and Y excitation electrodes as the means for measurement of the disturbance of the local capacitance due to proximity of the pointing digit, as shown in FIG. 10.

Such a system suffers from three major limitations.

1.) The sensing electrode as well as X and Y electrodes must all be exposed, or partially exposed, on the front surface of the touch pad, since the electrostatic flux lines must be able to pass between the pointing digit and each of the X, Y, and sensing electrodes. Since the front of the touch pad has only a finite area, this must be shared between all electrodes, potentially limiting the useful amount of capacitance change between the X or Y electrodes and ground, when the finger approaches the face of the touch pad.

2.) Thus the sensing electrode must be continuously exposed to electrical interference, over the whole front surface of the touch pad, potentially collecting the electrical noise.

3.) The response of the sensor to an approaching digit has an ambiguity in the readings. When the finger first approaches the face of the sensor, some of the cross-coupling flux is diverted to the finger, and via the body's capacitance, to the ground. Thus the signal becomes smaller. Then, as the finger further nears the front of the sensor, the cross coupling increases. It is not possible to deduce the true position of the pointing digit without complicated computations. In some situations it is not possible to determine the position at all.

The operations of the Capacitive Touch-Pad could also be described using terminology of "charge transfer", "charge redistribution", "differential capacitance sensing", etc. A person skilled in the art will have no difficulty in converting, reciprocally, to the methods described above.

It should be appreciated that nearly all of the Prior-Art circuits incorporate either a multiplexer to connect various electrodes to a single measurement circuit, or a plurality of measurement circuits acting at the same time on various electrodes.

It should also be appreciated that nearly all of the Prior-Art circuits are implemented as a unique custom-designed Integrated Circuit (IC) that contains both the analog circuitry necessary for Data Acquisition from the Capacitive Touch Pad Sensor, and the digital circuitry, often in the form of microcontroller, for extraction and processing of digital position information, and for communications with the Host system. However, the provisions for the analog and digital portions of this IC are quite different, with independent and often conflicting requirements, which include the type of silicon process, number of masks and processing steps, and feature dimensions on the die. Therefore, the single-IC approach may or may not be the most cost-effective, and the circuits made up from several ICs, some analog, and some digital, may in fact have a lower cost.

Additionally, the design and fabrication of a single application-specific IC may incur significant time as well as manufacturing expense. Any changes or adjustments to the original design may sustain the same level of expenditure. Therefore, it is advantageous to utilize common components, available "off the shelf", and it is desirable to be able to make changes and adjustments (such as dimensions or functionality of the CTP, for example), without going through the whole process of design and development of a custom IC.

SUMMARY OF THE INVENTION

This invention teaches a Circuit and an Algorithm for Data Acquisition from a Capacitive Touch Pad Sensor, including the method for creating the Sensor, which are much simpler then the Previous Art. Further benefits are:

Only a single channel of analog processing is required;

A novel method for measuring the change of capacitance is described, characterized by very fast settling time and low sensitivity to the noise;

A novel method for creation of Pulsed Programmable-Gain Amplifiers (PPGA) based on ground-referenced non-inverting integrator is described;

The complete circuit is resistant to the effects of ESD;

It utilizes general purpose "off the shelf" components and programmable microcontroller, providing flexibility for changes and adjustments without incurring the high costs of a custom IC design;

In a preferred configuration, when the microcontroller possesses a sufficient number of I/O pins, a multitude of sensing electrodes can be connected to a single Data Acquisition circuit without the need for an Analog Multiplexer;

When an I/O-limited microcontroller is used, the same number of sensing electrodes can be connected via an Analog Multiplexer for which a novel and optimal topology is disclosed;

When used with the described Algorithm, the circuit has high degree of noise rejection from both system and externally generated noises;

An Alternate Excitation and Synchronous Detector circuit provides even higher degree of noise rejection while freeing the microcontroller from some tasks during the Data Acquisition.

DESCRIPTIONS OF THE DRAWINGS

FIG. 2 depicts a simplified Prior-Art circuit, with

Figure 3:
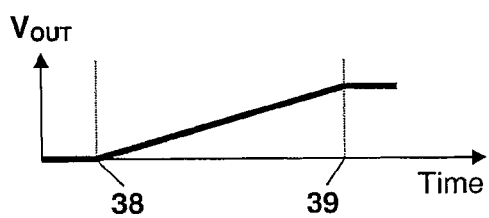

FIG. 3 showing a Prior-Art Waveform.

Figure 4:
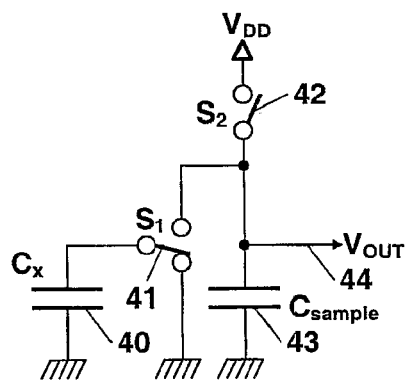

FIG. 4 is a simplified circuit per Current Invention, and

Figure 5:
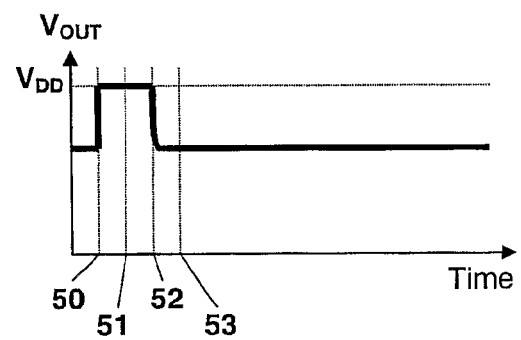

FIG. 5 shows a Waveform for the simplified circuit per the present Invention.

Figure 6:
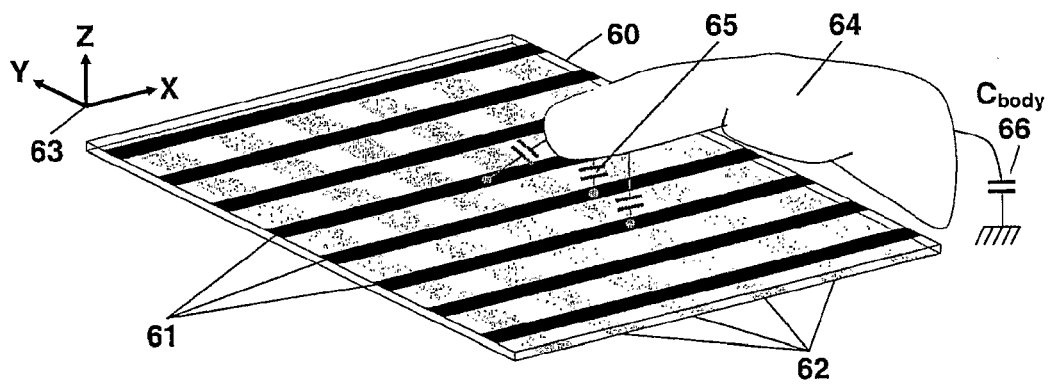

FIG. 6 demonstrates a Conceptual Capacitive Touch Pad Sensor.

Figure 7:
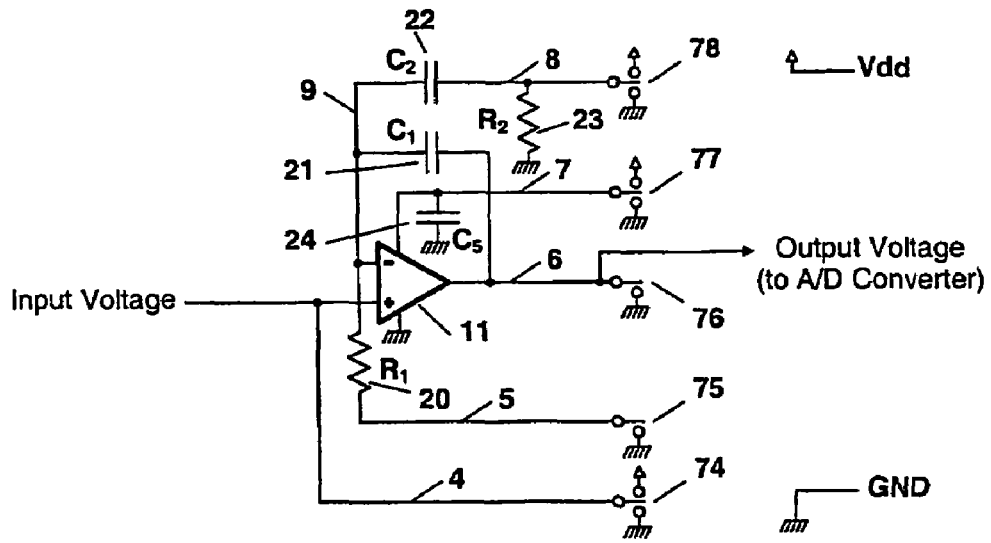

FIG. 7 depicts a Pulsed Programmable-Gain Amplifier (PPGA) circuit.

Figure 8:
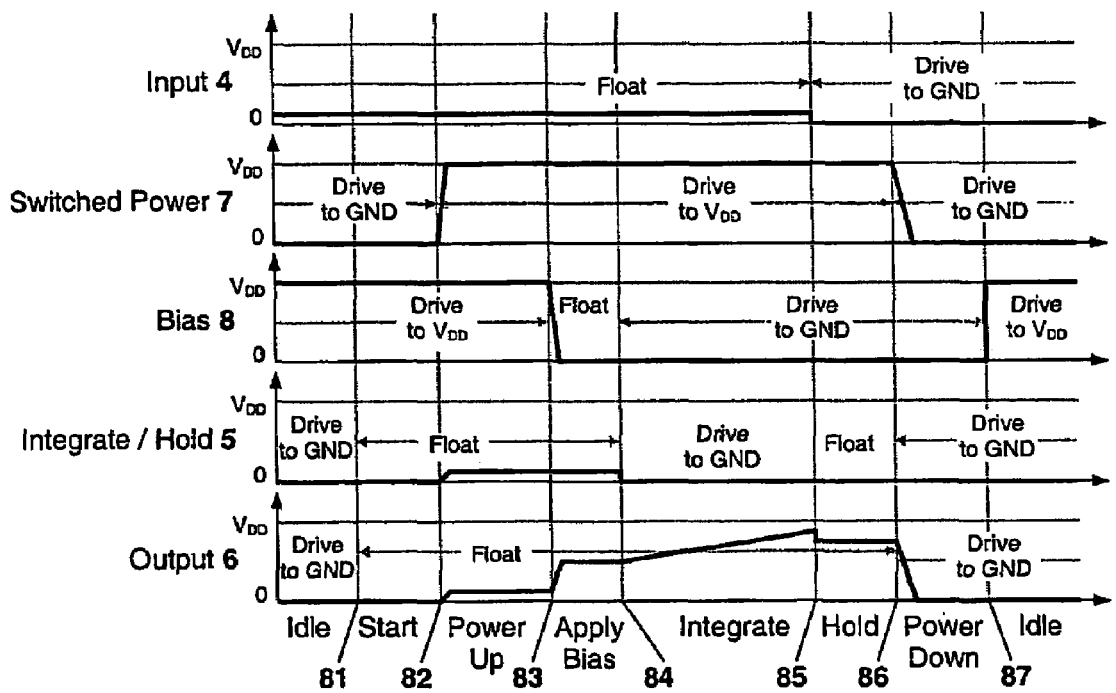

FIG. 8 depicts a Waveform for Pulsed Programmable-Gain Amplifier (PPGA) circuit.

Figure 9:
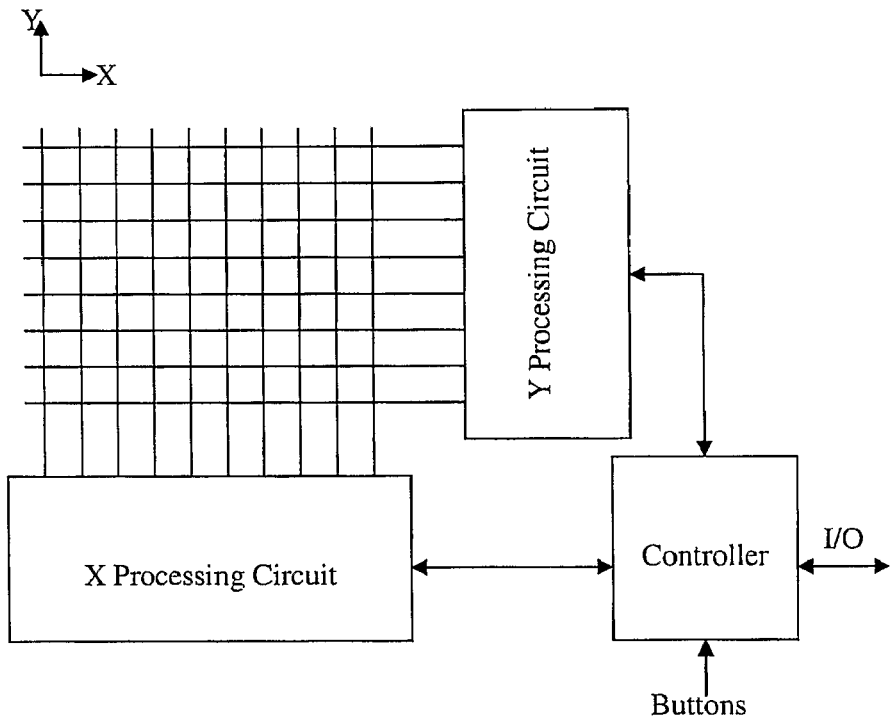

FIG. 9 shows a Conceptual Prior-Art circuit and

Figure 10:
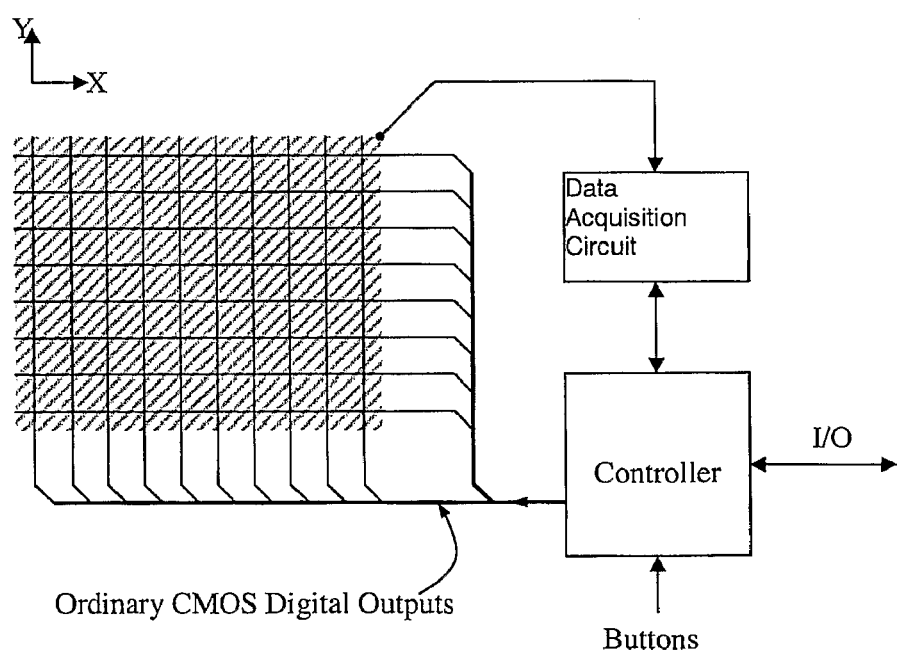

FIG. 10 shows a Conceptual Prior-Art circuit with a Single Sensing Electrode.

Figure 11:
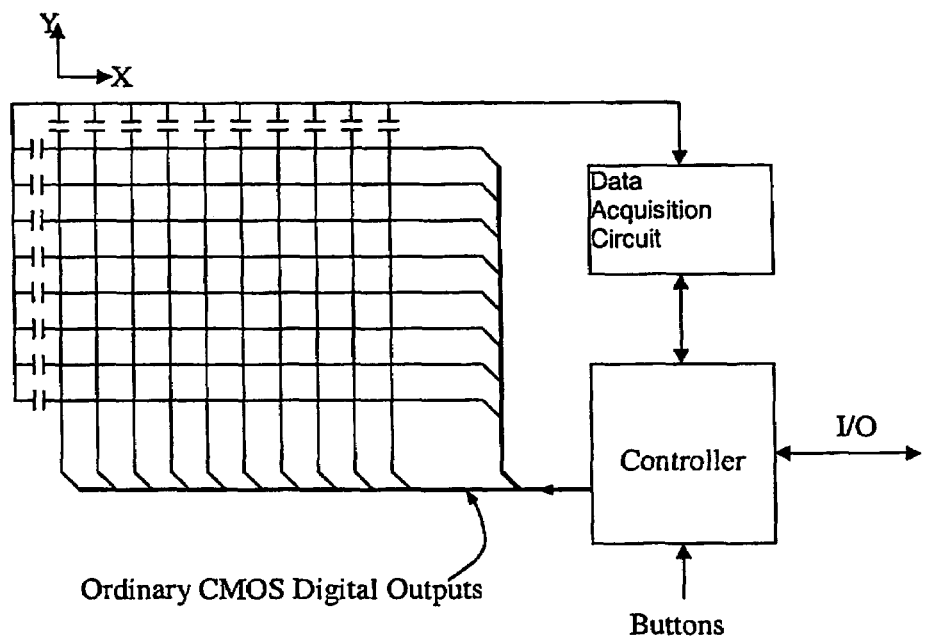
Figure 12:
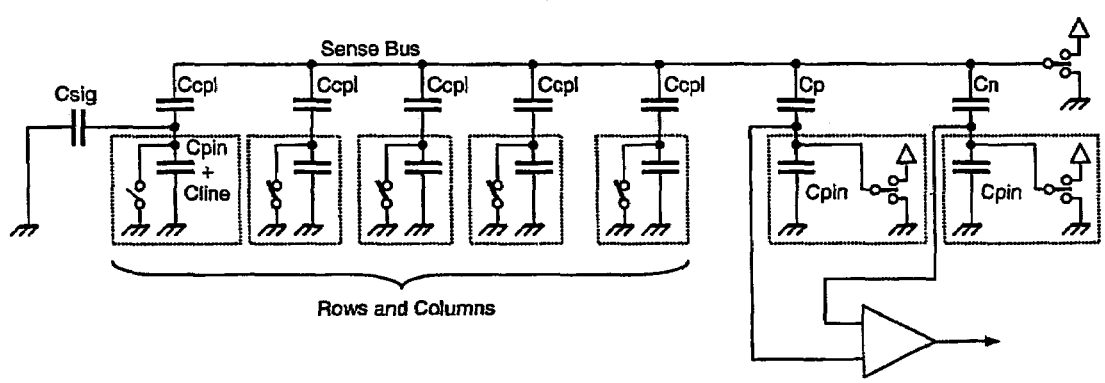

FIG. 11 depicts a Circuit without Multiplexer per the present Invention with FIG. 12 disclosing the Equivalent circuit for Data Acquisition without a Multiplexer per the present Invention.

Figure 13:
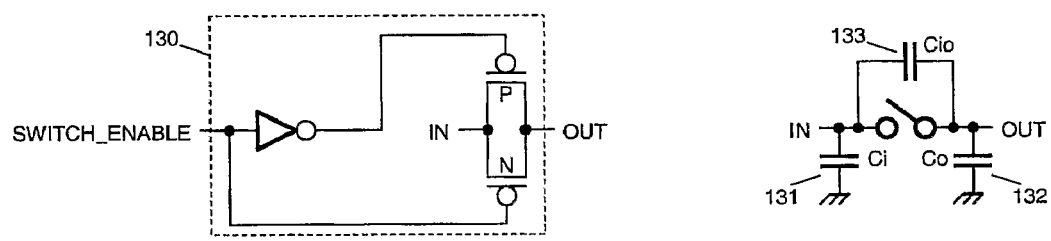

FIG. 13 demonstrates a Simple Analog Switch and Equivalent Circuit for Analog Signal.

Figure 14:
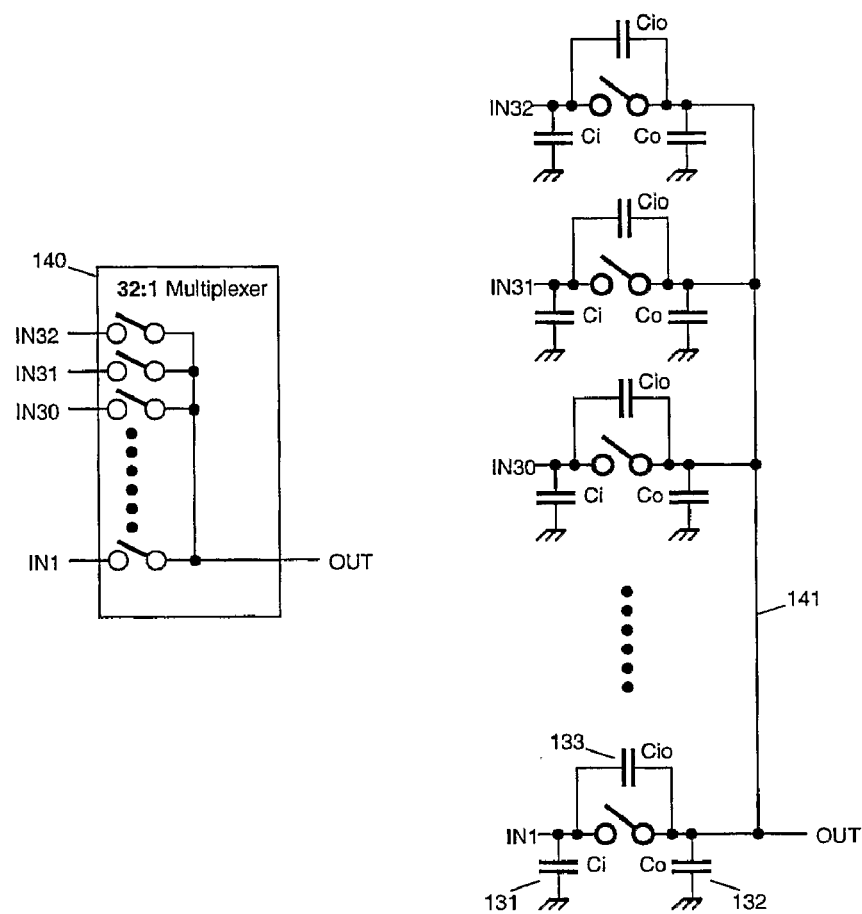

FIG. 14 shows a Prior-Art 321 Analog Multiplexer with a minimum number of switches.

Figure 15:
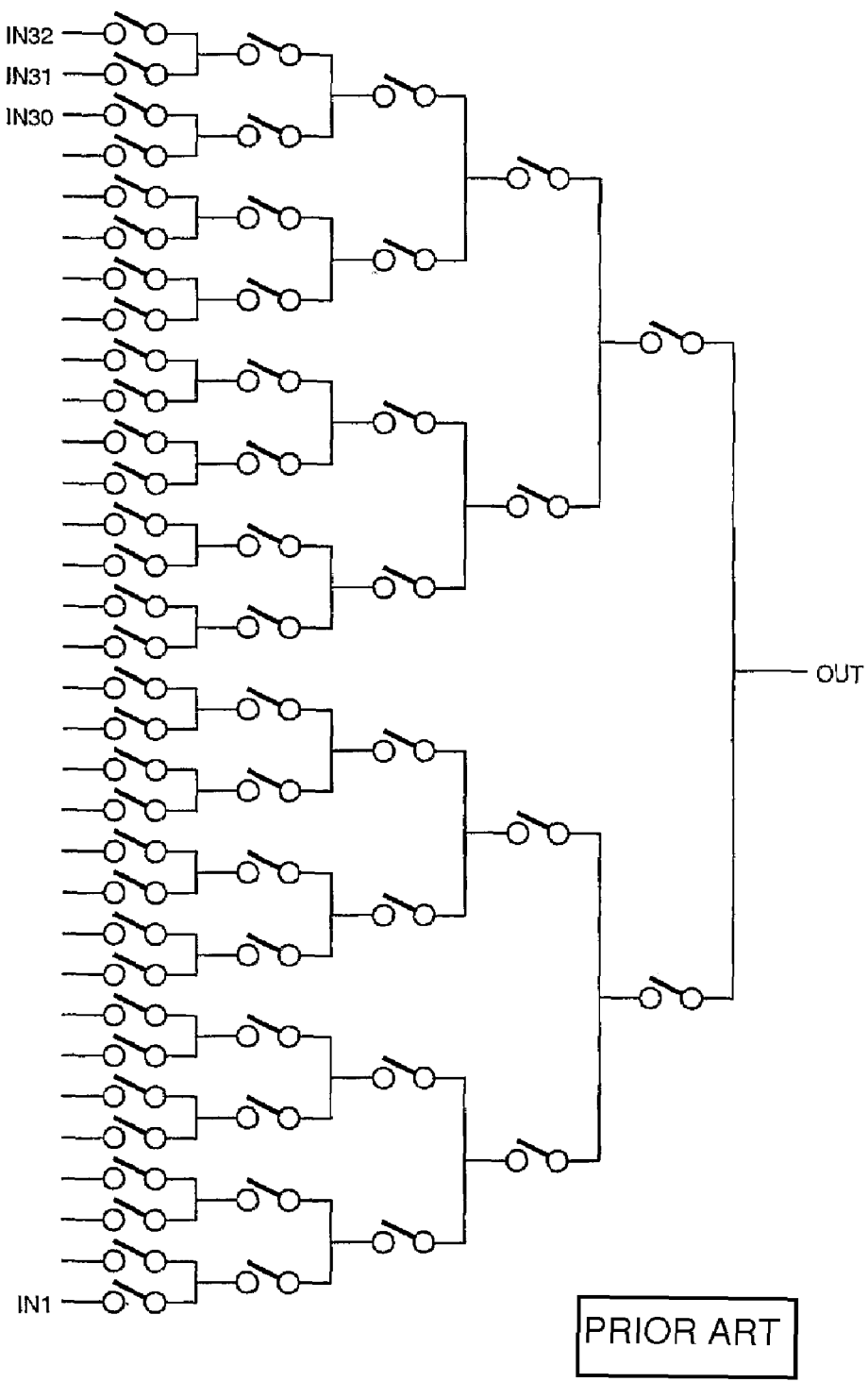

FIG. 15 shows a Prior-Art "Binary Tree" 321 Analog Multiplexer.

Figure 16:
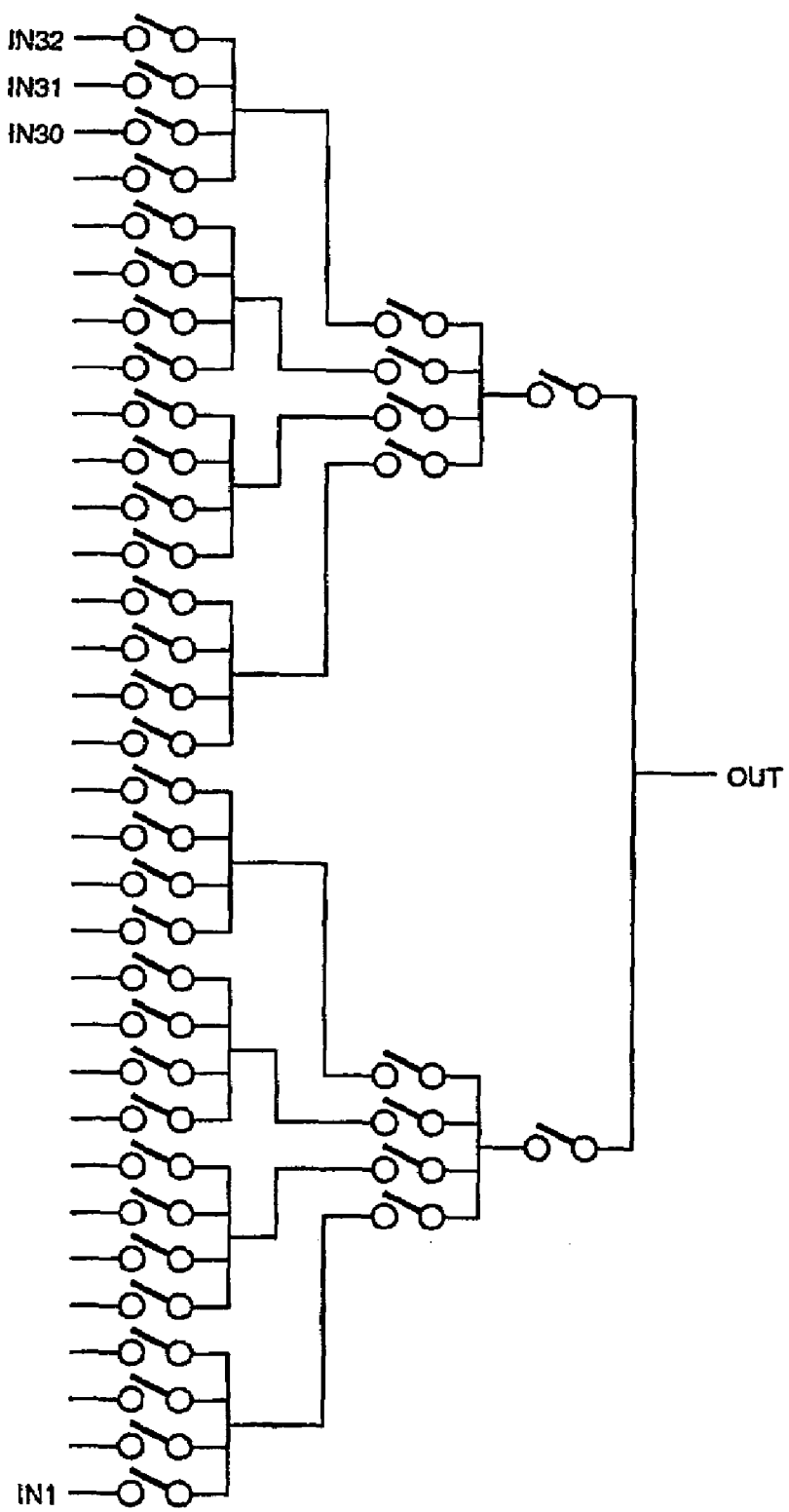

FIG. 16 discloses the Optimum-topology 321 Analog Multiplexer per the current Invention.

Figure 17:
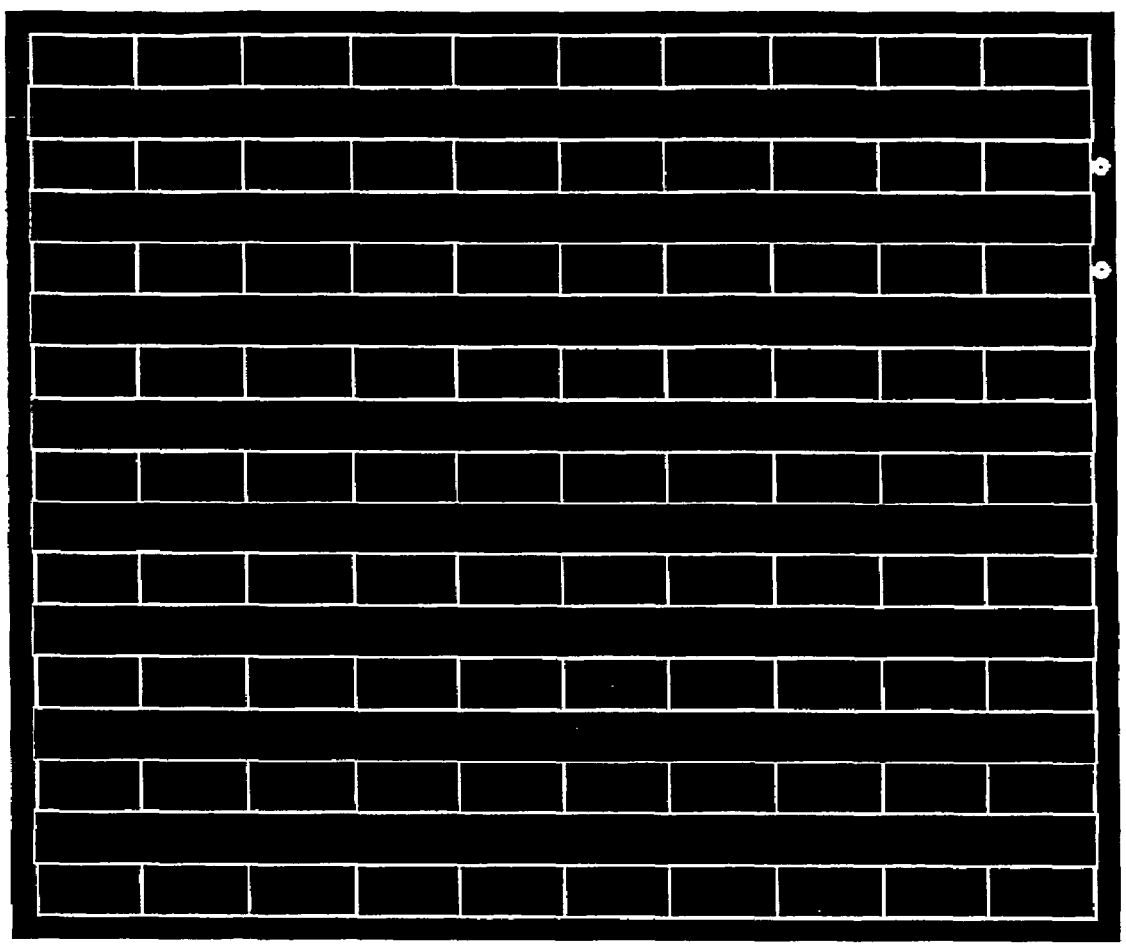

FIG. 17 shows a Top Layer of the Sensor's PCB.

Figure 18:
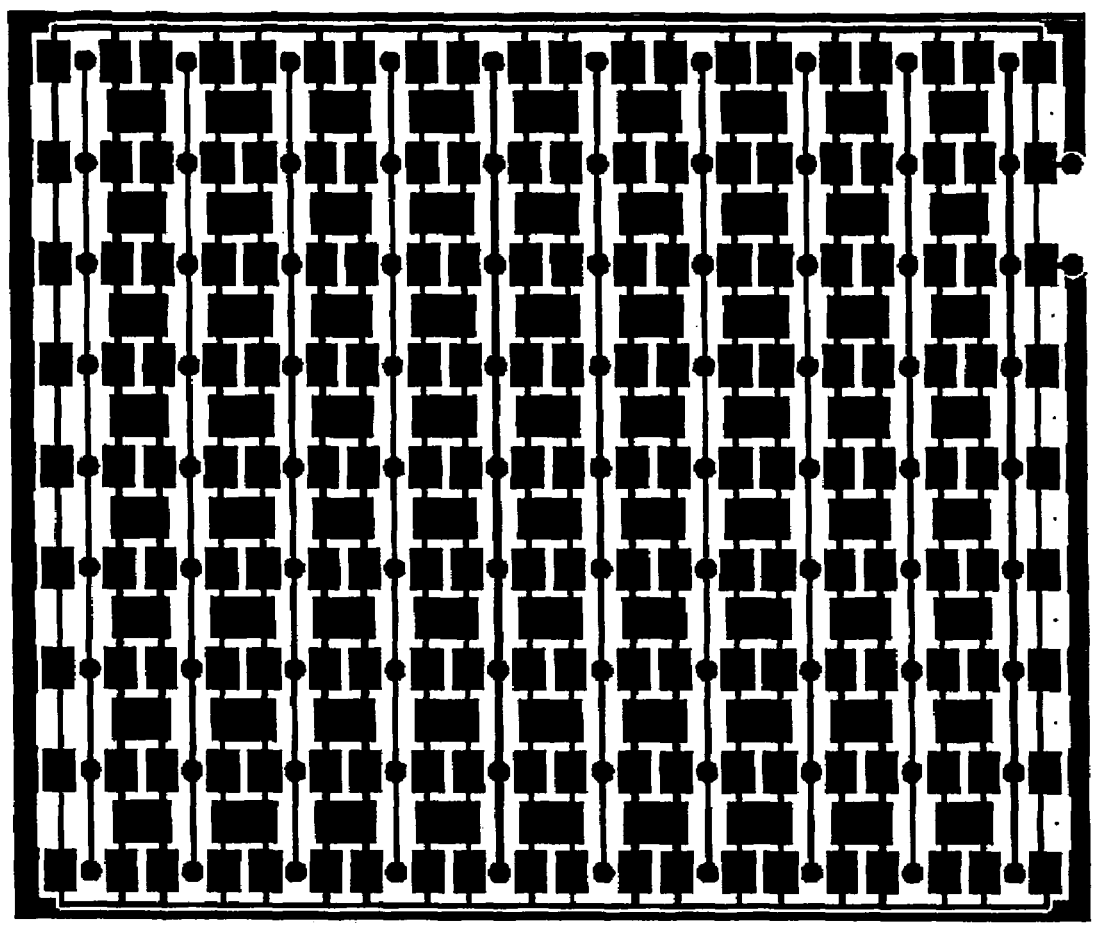

FIG. 18 shows a First Inner Layer of the Sensor's PCB.

Figure 19:
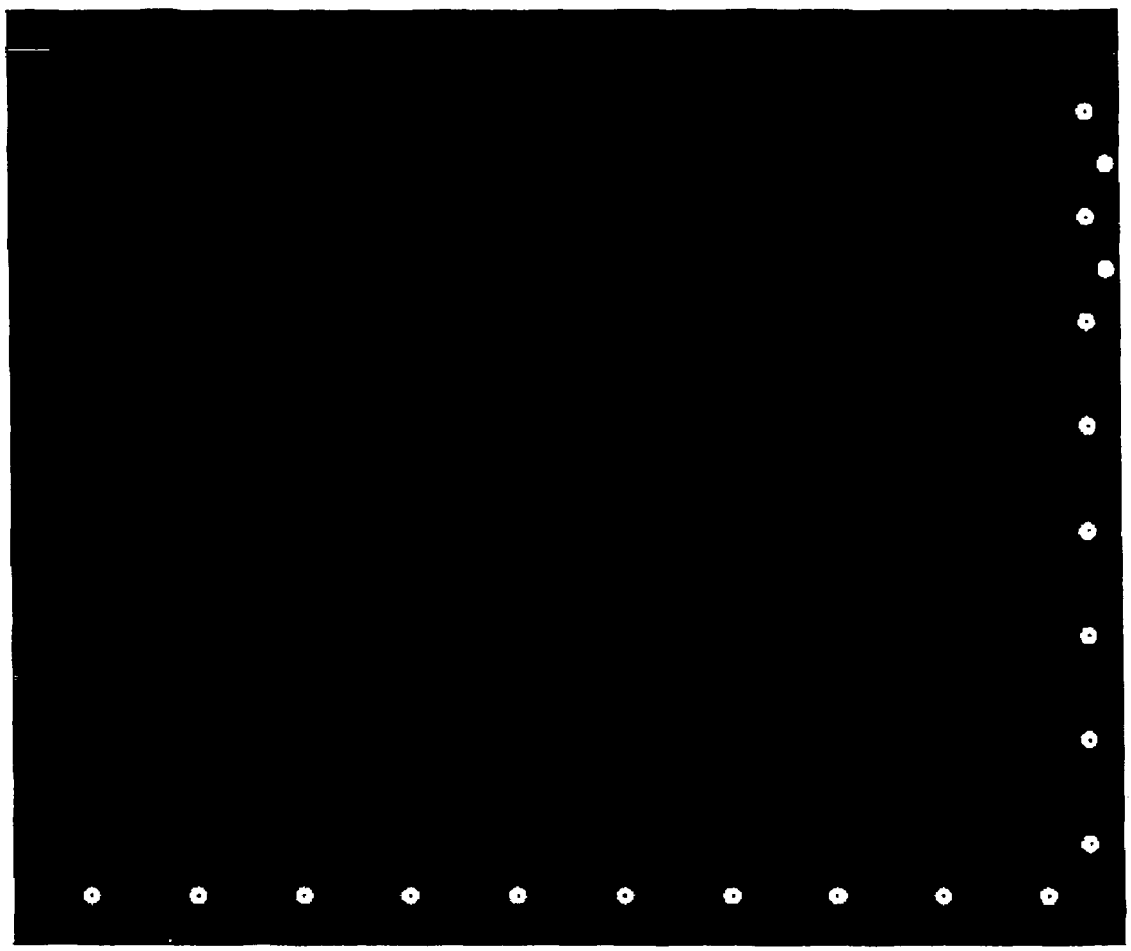

FIG. 19 shows a Second Inner Layer of the Sensor's PCB.

Figure 20:
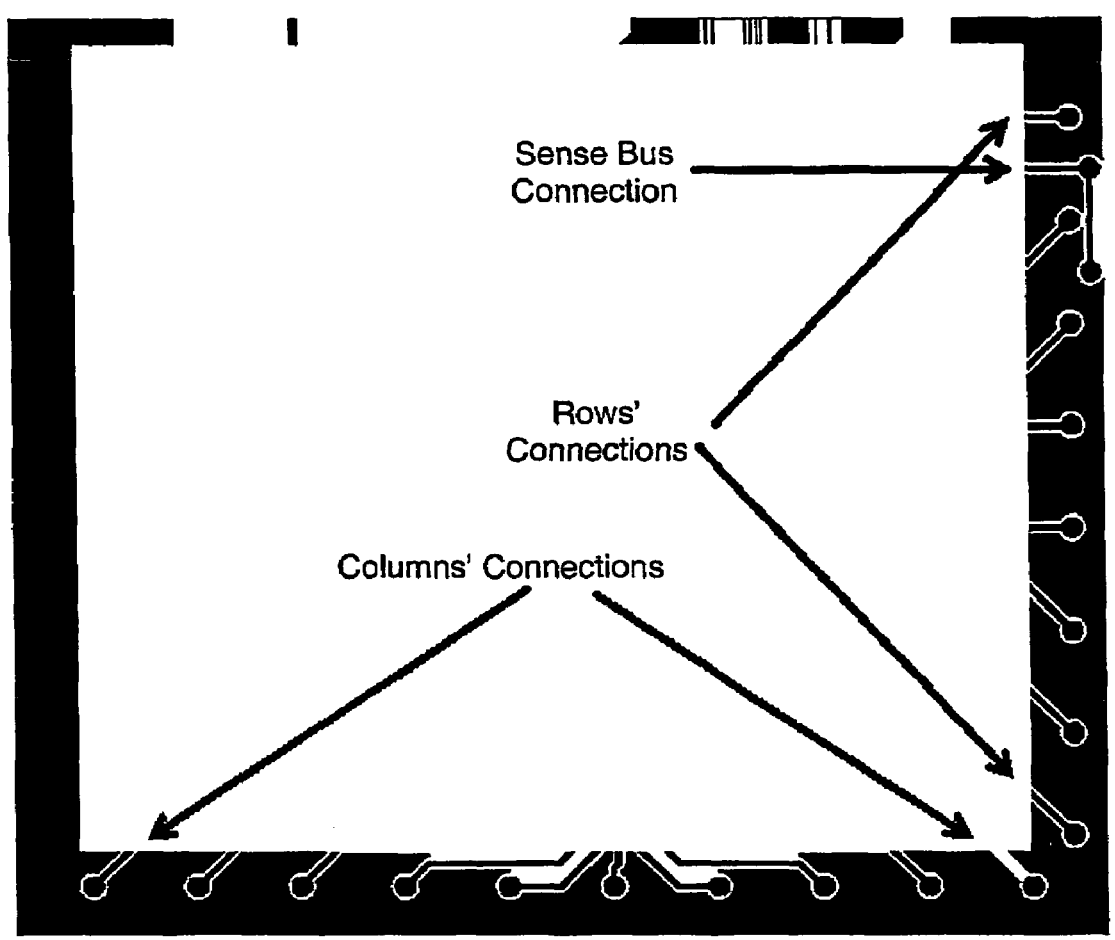

FIG. 20 shows a fragment of the Bottom Layer of the Sensor's PCB.

Figure 21:
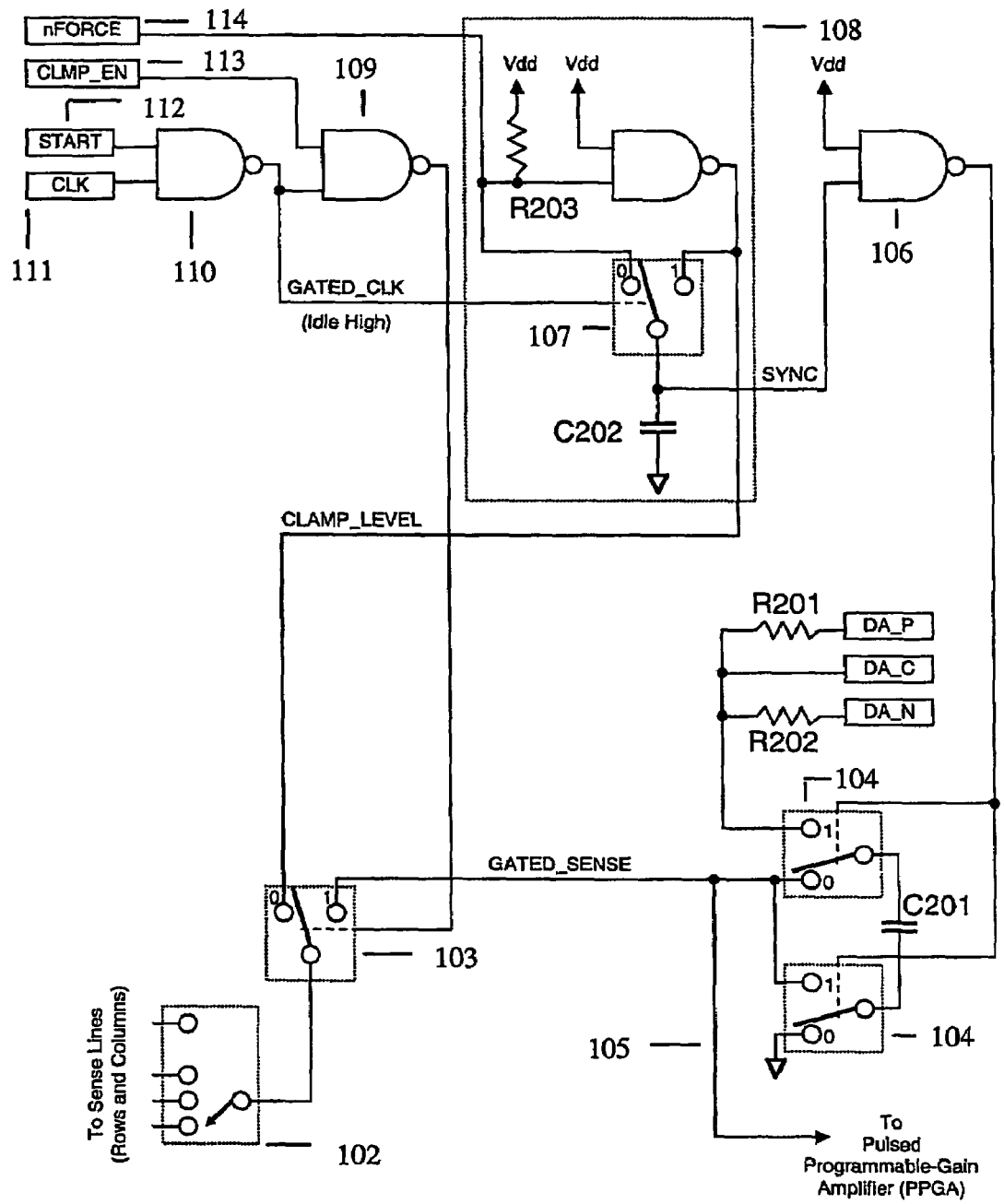

FIG. 21 discloses an Alternate Excitation and Synchronous Detector circuit.

DETAILED DESCRIPTION

A Conceptual Capacitive Touch Pad 60 is demonstrated in FIG. 6. A non-conductive cover that provides galvanic isolation between the user's hand and the Sensor is omitted for clarity. Two groups of electrodes 61 and 62 are utilized. Group 61, with electrodes parallel to the X-axis, is used for determination of the Y coordinate (according to the system of coordinates depicted as 63). Group of electrodes 62, with electrodes parallel to the Y-axis, is used for determination of the X coordinate. When digit 64 is located on or near the surface of the Sensor, the capacitances 65 between the digit 64 and electrodes belonging to group 61 (as illustrated in FIG. 6) allow for the determination of the position of the digit's tip 64 in the Y-axis. The capacitances between the digit 64 and group of electrodes 62 (not shown for clarity) allow the determination of the position in the X-axis. It should be noted that the user's body does not need a galvanic contact to ground, and parasitic body capacitance 66 to ground is sufficient for reliable operations, as it is typically several orders of magnitude larger than the capacitances 65.

The position is determined by measurement of the changes of the capacitances to ground for all the electrodes (belonging to both group 61 and 62), followed by extrapolation of the position between the electrodes. Some of the Previous Art implementations describe the operations in terms of "mutual" capacitance between the electrodes, which is equivalent.

Figure 2:
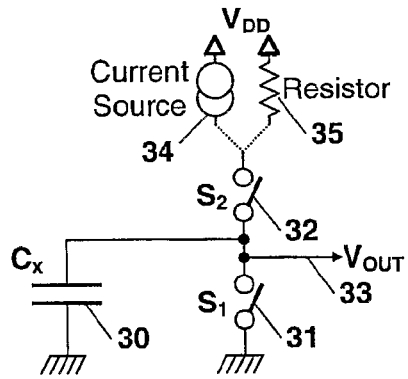

For the measurement of the capacitance changes, all Prior-Art circuits known to the applicant use the method illustrated in FIGS. 2 and 3. While this depiction is a much-simplified form of the actual possible Prior-Art circuits, it faithfully describes the operations of such circuits.

By manipulation of the electronic switches 31 and 32 (FIG. 2) the capacitor 30 is first discharged, until the time point 38 (FIG. 3), and then charged for a pre-determined time, between the time points 38 and 39. At a time 39 the Current Source 34 or Resistor 35 are disconnected by means of the switch 32, and the output voltage 33 is a linear but inverse representation of the capacitance for capacitor 30.

It can be readily observed by a person skilled in the art that this measurement must have some duration that cannot be made arbitrarily short, as some time is required for the capacitor to acquire the charge by means of the Current Source 34 or a simple resistor 35.

It can also be observed that the circuit is sensitive to any noise currents acting on capacitor 30, for the whole duration between points 38 and 39, and beyond.

In contrast, the circuit according to the current invention uses charge redistribution, with the minimum time determined by the time constant between the capacitors 40 and 43, and the internal resistance of activated switch 41 (FIG. 4), that can be made arbitrarily short. In operation, the capacitor 40 is discharged to ground by switch 41 while capacitor 43 is charged to Vdd by switch 42 (which is closed between time points 50 and 51). The capacitor 40 is then connected to capacitor 43 via switch 41 at time point 52, and the output voltage 44 of the circuit quickly settles to the final value, followed by switch 41 again connecting capacitor 40 to ground at point 53. Since the time interval between the points 52 and 53 can be made arbitrarily short, the whole circuit can be made quite resistant to the effects of noise currents following into capacitor 40.

Those skilled in the art will appreciate that the teachings of the invention do not require the specific circuit shown in FIG. 4. For example it is possible to rearrange FIG. 4 slightly. Switch 41 may be connected goes not to ground but to VDD. Switch 42 may be connected not to VDD but to ground. With the circuit rearranged as just described, the sequence of steps is as follows:

Discharge 43 by means of switch 42. During this time switch 41 is down which means capacitor 40 gets charged up.

Open 42.

Flip switch 41 up. Charge flows from 40 to 43 until the voltages are the same.

Measure the voltage on the two capacitors.

Flip switch 41 down. Then measure the voltage on 43. This voltage is more or less linear with the capacitance 40.

Those skilled in the art will readily appreciate that there are many more simple topologies and algorithms that do the same thing. The prior art uses currents in order to measure the capacitance (which requires time to accumulate the charge), and the present invention uses charge redistribution (which is much faster as it only needs the redistribution currents to subside to zero or enough as to be negligible, or even not that much—as long as the timing remains the same).

Stated differently, there are many workable configurations in connection with the invention, but the method in each case is the same—the charge on the sense electrode (Cx) and on the sample Capacitor gets combined together, redistribution currents flow for a very short time, the electrode gets disconnected so as not to introduce any more noise, and the voltage on the sampling capacitor now reflects the capacitance of the electrode plus some fixed offset.

Figure 1:
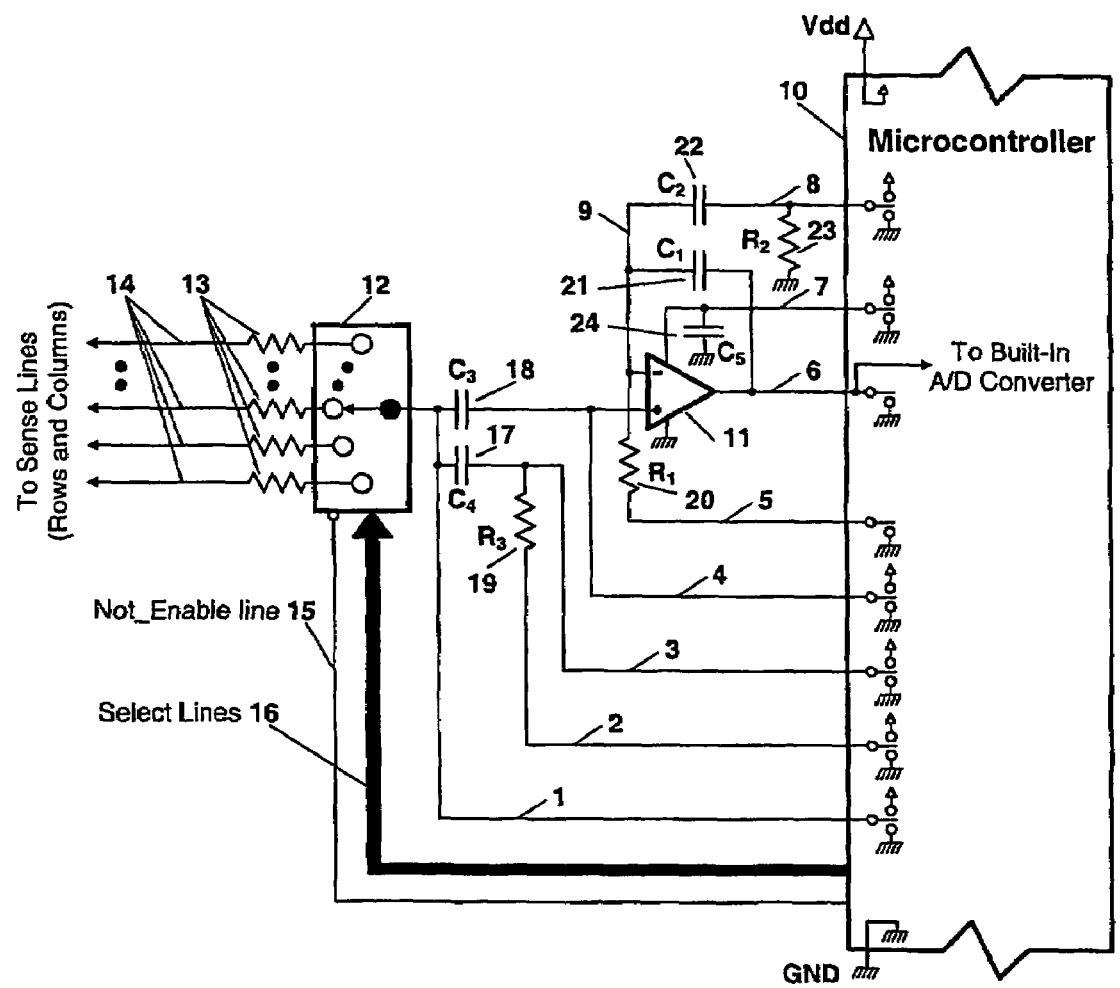
FIG. 1 is the circuit for Data Acquisition from Capacitive Touch Pad Sensor per current invention.

FIG. 1 shows another embodiment of the invention. The circuit of FIG. 1 utilizes two capacitors 17 and 18 (FIG. 1) that are manipulated by means of the lines 1, 3, and 4 that are in turn connected to the output pins of a microcontroller 10. Various switches represent the actions of the microcontroller's pins. As the result of the Acquisition Algorithm, the capacitors 17 and 18 acquire charge that is the same in magnitude but opposite in sign, and proportional to the capacitance of a Row or a Column connected to the line 1 via the Multiplexer 12, preferably an Optimal-Topology unit described elsewhere in this text and illustrated in FIG. 16. On the other hand, the effects of the noise currents are the same both for magnitude and polarity. When two capacitors 17 and 18 are connected in series and presented to the input of the Pulsed Programmable-Gain Amplifier (PPGA) on line 4, the noise effects are cancelled, and the useful signals are doubled.

FIG. 1 will now be described in more detail with respect to resistor 19. Resistor 19 is used for introduction of small compensating offset voltages. By connecting line 1 to GND or Vdd, and connecting resistor 19 alternatively to GND and Vdd, for predetermined durations (this may be envisioned as a single-cycle Pulse-Width-Modulation), a controlled amount of charge, and thus a controlled voltage change can be introduced on capacitor 17.

Likewise, if line 4 is connected to GND or Vdd (line 1 is floating) and resistor 19 is connected alternatively to GND and Vdd, a controlled voltage change can be achieved on both capacitors 17 & 18 (and this voltage change will probably be almost the same on each of the caps, and the same in sign).

In practice, resistor 19 is only used for "small" voltage changes/adjustments, and this may be considered as a sort of "Fine D/A", with the word "Fine" reflecting the "smallness" of the adjustment. However, arbitrarily large voltage changes can be affected on caps 17 & 18 if an appropriately large amount of time is used for the process, or if the Vdd value is appropriately large, or both.

This "Fine D/A" procedure for introduction of compensatory offsets can be conducted before or after the signal is acquired by charge transfers between the electrodes and caps 17 & 18. There are some implications, such as reduction of useful signal if the procedure is carried out after the charge transfers for signal acquisition, but the effects are small if the adjustment is small.

The actual operations of this "D/A" are described in PCT publication no. WO 01-56163 published Aug. 2, 2001, except the "Coarse D/A" is achieved by manipulation of capacitors 17 & 18, and use of the parasitic capacitance on "Sense" line 1.

Resistors 13 will bow be discussed. Series-limiting resistors 13 can be added in lines 14 going to the Rows and Columns, providing sufficiently robust protection against ESD events, in addition to the ESD protection built-into the Multiplexer 12.

It should be appreciated that the use of resistors 13 presents a tradeoff, as illustrated by some typical values. A sensing electrode (in the context of a Capacitive Touch Pad) may have a capacitance of 5 pF. With a series resistor of 1000 Ohms a 5 pF cap will create a time constant of 5 nanoseconds. If one uses a settling time defined as ten time constants (thus yielding an accuracy of some 0.005%) then it is only necessary to wait for 50 ns. For normal functioning of the circuit, one probably needs only about 3–5 time constants (as long as the settling time is the same each and every time), so that actual times on the order of 15 to 25 ns are needed (e.g. for a 25 ns time interval one needs a 20-MHz clock, using one-half of a cycle. This compares with an exemplary clock rate of 4 MHz).

Thus resistors in the range of several kilo Ohms could be used (which are totally adequate for protection from ESD), as opposed to resistors in the range of several tens of Ohms (which is barely large for adequate protection).

Operation of the circuit of FIG. 1 will now be discussed. Exemplary steps are as follows:

Step 1. Discharge capacitors 17 and 18 by driving lines 1, 2, 3, 4 to GND;

Step 2. Set multiplexer 12 to the appropriate channel by means of select lines 16, enable it with line 15;

Step 3. Float all lines except line 1. Note that during this time, nothing that happens at the sense lines will affect anything in our circuit because line 1 is grounded.

Step 4. Float line 1;

Step 5. Drive line 4 to Vdd. Note that the duration of the time when line 4 is connected to Vdd should be as short as possible and equal to the duration of step 7. (In an actual microcontroller program steps 4 & 5 can be executed in a single instruction);

Step 6. Float line 4;

Step 7. Drive line 3 to GND. Note that the duration of the time when line 4 is connected to GND should be as short as possible and equal to duration of step 5 (likewise— steps 6 & 7 can be executed in a single microcontroller instruction);

Step 8. Float line 3;

Step 9. Disable the multiplexer 12 via line 15;

Step 10. Drive line 3 to Vdd (remove charges streaming from parasitic capacitance of the sense line 1 from capacitor 17);

Step 11. Float line 3;

Step 12. Drive line 4 to GND (remove charges streaming from parasitic capacitance of the sense line 1 from capacitor 18);

Step 13. Connect resistor 19 to Vdd and then to GND, with the duration of the whole step 13 fixed (constant) for each and every channel, and the duration of the time when resistor 19 is connected to Vdd and the duration when it is connected to GND selected so that the voltage between lines 4 and 3 is normally zero at the end of step 13 when the sensing electrode is not touched;

Step 14. Float line 4, drive line 3 to GND (present signal to the input of PPGA);

Step 15. Perform signal amplification in the PPGA, perform A/D conversion in the microcontroller;

Step 16. Return to Idle condition (same as step 1).

A principal action of the algorithm is to reduce the interference (noise), which comes (or can always be modelled) in the form of current being injected into the sensing electrode. In order to reject as much of this interfering signal as possible, the durations of the intervals when capacitors 17 and 18 are connected to the sensing electrode (via the multiplexer) and at the same time have a low-impedance path to GND (or Vdd)—should be as close as possible to being exactly the same and should be as short as possible. Capacitors 17 and 18 should also have as close as possible to exactly the same value. In a practical circuit the matching between the caps can never be better than 5% as more precise components become extraordinarily expensive. The inability to have very high rejection of the interference is the principal reason for FIG. 21.

The interfering current will flow into (or out from) the left side plate of each of the capacitors 17 and 18. After the sampling, both capacitors 17 & 18 will have some voltage due to this interference, but since these caps are connected in series when connected to the amplifier, the interfering signal will be zeroed out (when the signal is presented to PPGA, line 1 (junction of Caps 17 & 18) may have several Volts of interfering signal on it—it will still be suppressed).

It should also be appreciated that steps 5 and 7 could be repeated many times. Repeating a complete measurement cycle can also have a benefit of reducing the noise. Repeating a complete measurement cycle and averaging the results is a straightforward affair as will be appreciated by those skilled in the art.

It will also be appreciated that the circuit in FIG. 21 (below) does such multiple sampling by itself.

The Pulsed Programmable-Gain Amplifier (PPGA) part of the circuit is illustrated in FIGS. 7 and 8.

The circuit is a Ground-referenced Non-inverting Integrator with Switched-Power. Connecting the integration resistor 20 to ground (via Integrate/Hold line 5) activates integrating cycle; the length of the integration cycle controls the virtual gain of the PPGA in a linear fashion.

In other words, the apparent gain of the Amplifier can be set by simply providing a pulse of an appropriate duration, which is an easy task for a microcontroller.

Capacitor 22 is used to inject an appropriate amount of charge into the summing junction of the Operational Amplifier (OpAmp) 11, before the start of the integration cycle, so that the output 6 will be biased at a convenient point between ground and Vdd, for example at ½ Vdd, and OpAmp will be fully functional even if it does not posses a rail-to-rail output stage. When a single measurement is complete, and the microcontroller's A/D converter has produced the digital sample, the power on the supply line 7 to the OpAmp 11 is removed, and all capacitors are discharged or charged as required via lines 5, 6, and 8. The PPGA is now ready for the next sample.

The Data Acquisition Circuit consists of only several low-cost components (resistors, capacitors, and a single Dual-Operational-Amplifier IC). The rest of the functionality can be handled by an off-the-shelf microcontroller IC with an appropriately sufficient number of I/O pins, execution speed, and program space. Most of the modem low-integration microcontrollers are suitable for this task.

This invention also dispenses with the limitations of the single-sense-electrode systems noted above.

Instead of a sensing electrode, which is exposed on the front of the sensor, the current invention utilizes a capacitive array that is specifically shielded from the front of the sensor. This capacitive array is implemented inside the sensors PCB and does not require actual discrete components mounted on the PCB. The exemplary implementation of the PCB is depicted in FIGS. 17 thought 20.

In operation, individual capacitors in this capacitive array couple each of the electrodes (from the groups of X or Y electrodes) to the Data Acquisition Circuit. Any electrode could be excluded from the current measurement by simply driving the appropriate pin to ground. The electrode or electrodes that are a part of the current measurement cycles are permitted to float, by disabling the drivers on the appropriate pins.

In addition to the function of combining the signals to a single Data Acquisition Circuit, the capacative array is used to develop, various offset voltages as required to compensate the circuit under steady-state conditions. This function is activated by first discharging all elements of the capacitive array (by driving all of them to ground), and then installing appropriate logical levels on each of the lines connected to X and Y electrodes. This action creates a voltage that is linearly proportional to the number of pins driven to the High logic level (typically the supply voltage).

While the capacitive array appears to act as a voltage divider, attenuating the signal by as many times as there are individual electrodes, the actual circuit's performance may actually be better than a circuit based on the Analog Multiplexer that is capable of connecting a single electrode to the measurement circuit. This behavior is due to the ever-present parasitic capacitances on the Multiplexer's pins, exemplified in FIG. 13. This effect is most noticeable in the case of a wide-input Analog Multiplexer, as shown in FIG. 14, where a 32-input unit is shown.

All of the output capacitances 132 added together amount to the same voltage-divider effect as the sensing capacitive array described above. For example, a 321 Multiplexer depicted in FIG. 14, while using the smallest number of Analog Switches also possesses the highest total parasitic capacitance. It is equal to $$C_{para}=32*C_o+C_i+31*C_{io}$$

Where Cpara is the total parasitic capacitance as seen on the Output 141 of the Multiplexer 140;
Co is the output capacitance 132 of a single switch 130,
Ci is the input capacitance 131 of a single switch 130, and
Cio is the feed-through capacitance 133 of an open switch.

This equation is not exact but quite sufficient for practical applications. In actuality, the term (32*Cio) is slightly lower due to the series connection of the capacitors 133 with the corresponding capacitors 131 and possibly the rest of the circuit. However, since Cio is typically much smaller than Ci, the above equation is very near the actual value. The added term Ci is due to a single closed switch, which is a typical condition for the Multiplexer's operations. In view of the fact that the switch is symmetrical (e.g. any input can serve as an output and vise versa), the input capacitance 131 (Ci) is typically equal to the output capacitance 132 (Co), and the above equation can be simplified to $$C_{para}=33*C_o+31*C_{io}$$

Just for comparison, it should be noted that there are 32 Analog Switches 130 in this configuration.

FIG. 15 depicts a familiar but rarely used "Binary-Tree" configuration This topology for the Multiplexer results in the following equation $$C_{para}=15*C_o+5*C_{io}$$

While it provides a sizable improvement for the parasitic capacitance, this configuration also needs 62 Analog Switches and effects a 5× increase in the Multiplexer's impedance. This topology can be described as 16 21 Multiplexers feeding into 8 21 Multiplexers that in turn are connected to 4 21 Multiplexers feeding into 2 21 Multiplexers that are finally connected to a 21 Multiplexer.

An exemplary preferred configuration per current invention is shown in FIG. 16. It can be described as 8 41 Multiplexers feeding into 2 41 Multiplexers that are connected to a 21 Multiplexer. This preferred configuration has the parasitic capacitance that is even smaller than the "Binary-Tree" topology, namely $$C_{para}=13*C_o+7*C_{io}$$

There are only 42 Analog Switches and the series impedance of the Multiplexer is increased only by a factor of 3×. This topology also requires a moderate amount of necessary digital support circuitry, namely two 24 decoders/demultiplexers and a single un-encoded control line (provided that the 321 Multiplexer is being controlled by a 5-bit binary word). This requirement contrasts with a need for a 532 decoder/demultiplexer (quite complex) for the 321 Multiplexer that uses the smallest number of Analog Switches 130. The complexity of the required digital circuit is in fact close to no decoding at all, similar to the "Binary-Tree" configuration (that uses 62 Analog Switches 130).

It should be noted that the order in which the constituent Multiplexers are interconnected will not affect the value of parasitic capacitance and the complexity of the supporting digital circuit, however it will affect the required number of Analog Switches. For example, a 321 Multiplexer constructed as 16 21 Multiplexers feeding into 4 41 Multiplexers in turn connected to a final 41 Multiplexer will have the same amount of parasitic capacitance $$(C_{para}=13*C_o+7*C_{io})$$

but will require 52 Analog Switches 130.

A topology with 8 41 Multiplexers followed by 4 21 Multiplexers finally connected to a 41 Multiplexer will need 44 Analog Switches 130 (a close second to the optimal configuration of FIG. 16).

The minimal parasitic capacitance of Multiplexer's configuration per current invention as shown in FIG. 16, coupled with minimal digital support requirements will result in the best-performing circuit implemented with the least amount of components.

Stated differently, the circuit designer may incur the expense of extra analog switches so as to reduce the number of parasitic capacitances that are capable of stealing charge during capacitance measurements. By adding enough switches to build a binary tree one has reduced greatly the parasitic capacitances. But the binary tree has the drawback of introducing a times-5 increase of throughput impedance.

The multiplexer structure according to the invention not only reduces the parasitic capacitances to an even lower level, but also presents only three stages of switching instead of five. This is still a greater throughput impedance than the 32-switch multiplexer, but presents a smaller throughput impedence than that of a multiplexer that has five stages of switching.

Stated differently by accepting an impedance that is three times as great as that of the 32-switch multiplexer, and by agreeing to add about ten extra switches, it is possible to provide a multiplexer that has about one-third as much parasitic capacitance as compared with that of the 32-switch multiplexer.

If a very high degree of noise and interference rejection is required, an exemplary circuit depicted in FIG. 21 should be used. It introduces the following improvements over the circuit in FIG. 1:

1.) A possible source of misbalance and thus lowered resistance to a Low-Frequency interference steaming from the use of two potentially non-matched capacitors 17 and 18 (C4 and C3 in FIG. 1) is removed, since the circuit in FIG. 21 uses only a single capacitor C201 for accumulation of both positive and negative charge distributions from the sensing electrode.

2.) Due to automatic application of excitation and accumulation of the charge, with timing controlled by a fast clock source (as apposed to signals generated by an execution of a program on a microcontroller), the "noise window" (the duration of time available for the noise current to affect the accumulated charge on C201) is greatly reduced, with corresponding increase in the resistance to noise and interference.

Measurements may be made as follows.

Step 1. Connect "gated sense" to the multiplexer 102 (switch 103 in position 1). Turn on the multiplexer 102, and select a sense line.

Step 2. Set switch 104 to position 1. Set DA_C high. This passes charge toward C201 which in turn passes charge to the sense line. The result is the sense line is positively charged and C201 is positive on top.

Step 3. Set switch 104 to position 0. Now the two capacitors (the sense-line capacitance and C201) will pass charge in whatever way is needed to equalize voltage. This subtracts the noise signal from itself and nearly cancels out the noise.

Next the "gated sense" line is disconnected from the sense line by setting switch 103 to position 0 or by disabling multiplexer 102, or both. Either way, the sense-line capacitance is no longer connected with C201 and now it is possible to measure the voltage on C201, safe against any noise inputs for the duration of the measurement procedure.

Those skilled in the art will have no difficulty devising myriad obvious variants and improvements upon the embodiments shown here without deviating in any way from the invention, all of which are intended to be encompassed by the claims that follow.

The invention claimed is:

1. Apparatus for use with a first number of sensing electrodes of a human-input touch pad, the apparatus comprising:
    a sampling capacitor having first and second leads;
    potential measurement means electrically connected with the sampling capacitor; and
    a multiplexer; the multiplexer comprising:
        a first switching stage comprising switches fewer in number than the first number, and comprising more than one switch, the switches having first ends electrically connected with the first lead of the sampling capacitor;
        a second switching stage comprising groups of switches, each group corresponding to a respective second end of a switch in the first stage, each group comprising more than one switch, the switches in each group having first ends electrically connected with the respective second end;
        a third switching stage comprising groups of switches, each group corresponding to a respective second end of a switch in the second switching stage, each group comprising more than one switch, the switches in each group having first ends electrically connected with the respective second end;
        each switch in the third switching stage having a second end electrically connected with one of the sensing electrodes.

2. Apparatus for use with a sensing electrode of a human-input touch pad, the apparatus comprising:
    a first sampling capacitor having first and second leads connected at its first lead by a first switch to the sensing electrode;
    a second sampling capacitor having first and second leads connected by its first lead to the first sampling capacitor and by the first switch to the sensing electrode;
    first switching means responsive to a first control signal for selectively applying a first potential to the sensing electrode;
    second switching means responsive to a second control signal for selectively applying a second potential to the first sampling capacitor at its second lead;
    third switching means responsive to a third control signal for selectively applying a third potential to the second sampling capacitor at its second lead; and
    analog-to-digital means electrically connected with the second lead of the second sampling capacitor.

3. A method for use with a sensing electrode of a human-input touch pad and with first and second sampling capacitors each having a first and second lead, the apparatus comprising:
    selectively applying a first potential to the sensing electrode;
    selectively applying a second potential to the first sampling capacitor at its second lead while its first lead is electrically connected to the sensing electrode;
    selectively applying a third potential to the second sampling capacitor at its second lead while its first lead is electrically connected to the sensing electrode;
    with the first leads of the first and second sampling capacitors electrically connected, selectively applying a fourth potential to the second sampling capacitor at its second lead, and
    measuring a potential at the second lead of the first capacitor.

4. Apparatus for use with a sensing electrode of a human-input touch pad, the apparatus comprising:
    a sampling capacitor having first and second leads,
    first switching means responsive to a first control signal for connecting the first lead of the sampling capacitor with the sensing electrode and connecting the second lead of the sampling capacitor to a first potential;
    the first switching means responsive to a second control signal for connecting the first lead of the sampling capacitor to a second potential and connecting the second lead of the sampling capacitor with the sensing electrode; and
    analog-to-digital means coupled with the sensing capacitor for measuring a potential thereof.

5. A method for measurement of capacitance at a sensing electrode of a capacitive-sensing human-input touch pad and with a sensing capacitor, the method comprising the steps of:
    connecting the first lead of the sampling capacitor with the sensing electrode and connecting the second lead of the sampling capacitor to a first potential;
    connecting the first lead of the sampling capacitor to a second potential and connecting the second lead of the sampling capacitor with the sensing electrode; and
    measuring a potential at the sampling capacitor, whereby a capacitance at the sensing electrode is measured.

6. Apparatus for use with a sensing electrode of a human-input touch pad, the apparatus comprising:
    first switching means responsive to a first control signal for selectively applying a first potential to the sensing electrode;
    a sampling capacitor;
    second switching means responsive to a second control signal for selectively applying a second potential to the sampling capacitor;
    third switching means responsive to a third control signal for selectively parallelling the sensing electrode and the sampling capacitor; and
    analog-to-digital means electrically connected with the sampling capacitor.

7. The apparatus of claim 6 wherein the first and third switching means are a single-pole double-throw switch, the third control signal comprising an inversion of the first control signal.

8. The apparatus of claim 6 wherein the first potential is ground.

9. The apparatus of claim 6 wherein the second potential is a positive voltage.

10. A method for measurement of capacitance at a sensing electrode of a capacitive-sensing human-input touch pad and with a sampling capacitor, the method comprising the steps of:
   applying a first potential to the sensing electrode;
   applying a second potential to the sampling capacitor;
   paralleling the sensing electrode and the sampling capacitor; and
   measuring a potential at the sampling capacitor, whereby a capacitance at the sensing electrode is measured.

11. The method of claim 10 wherein the first applying step and the paralleling step are accomplished by operating a single-pole double-throw switch.

12. The method of claim 10 wherein the first potential is ground.

13. The method of claim 10 wherein the second potential is a positive voltage.

* * * * *